Patented May 23, 1950

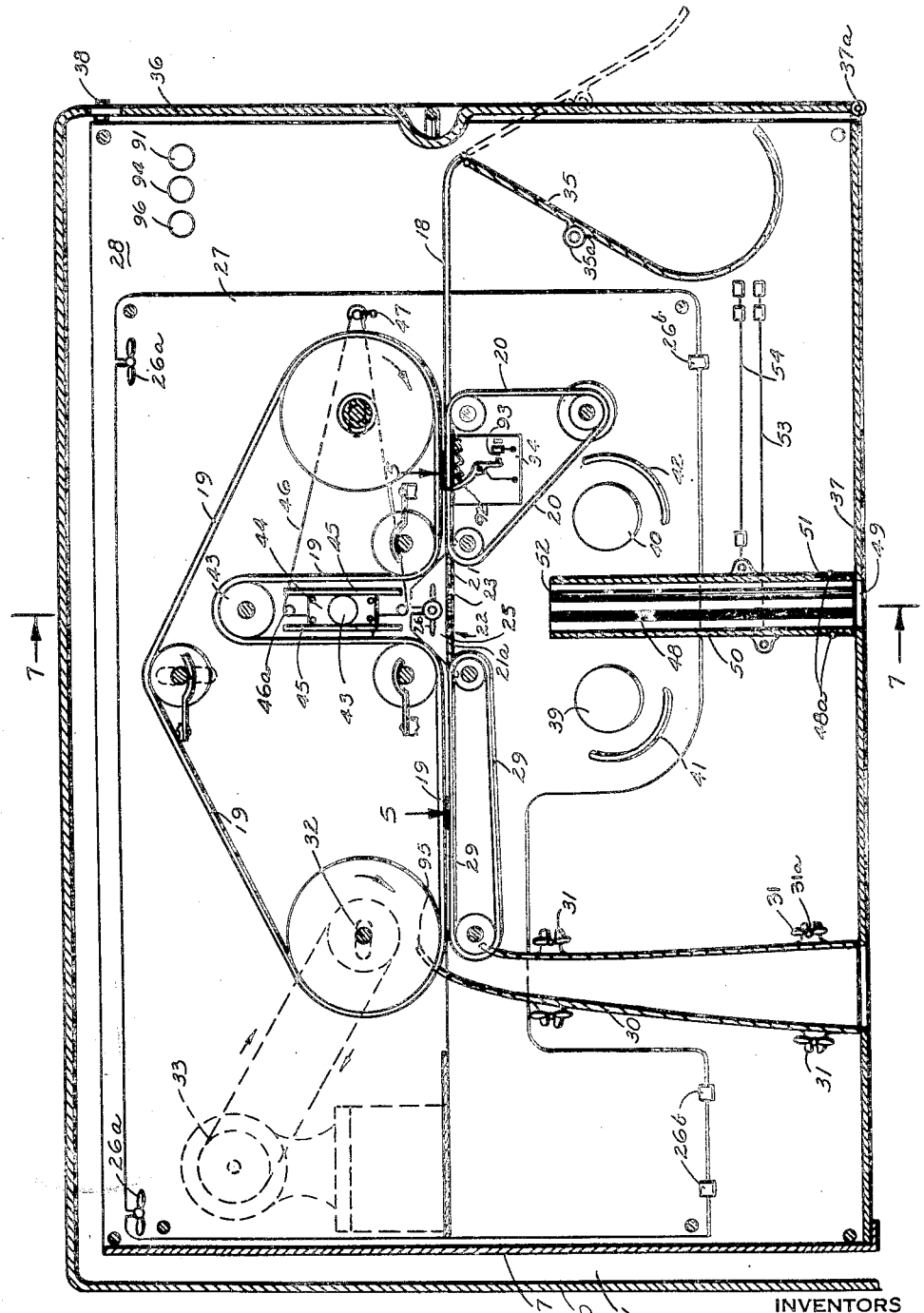

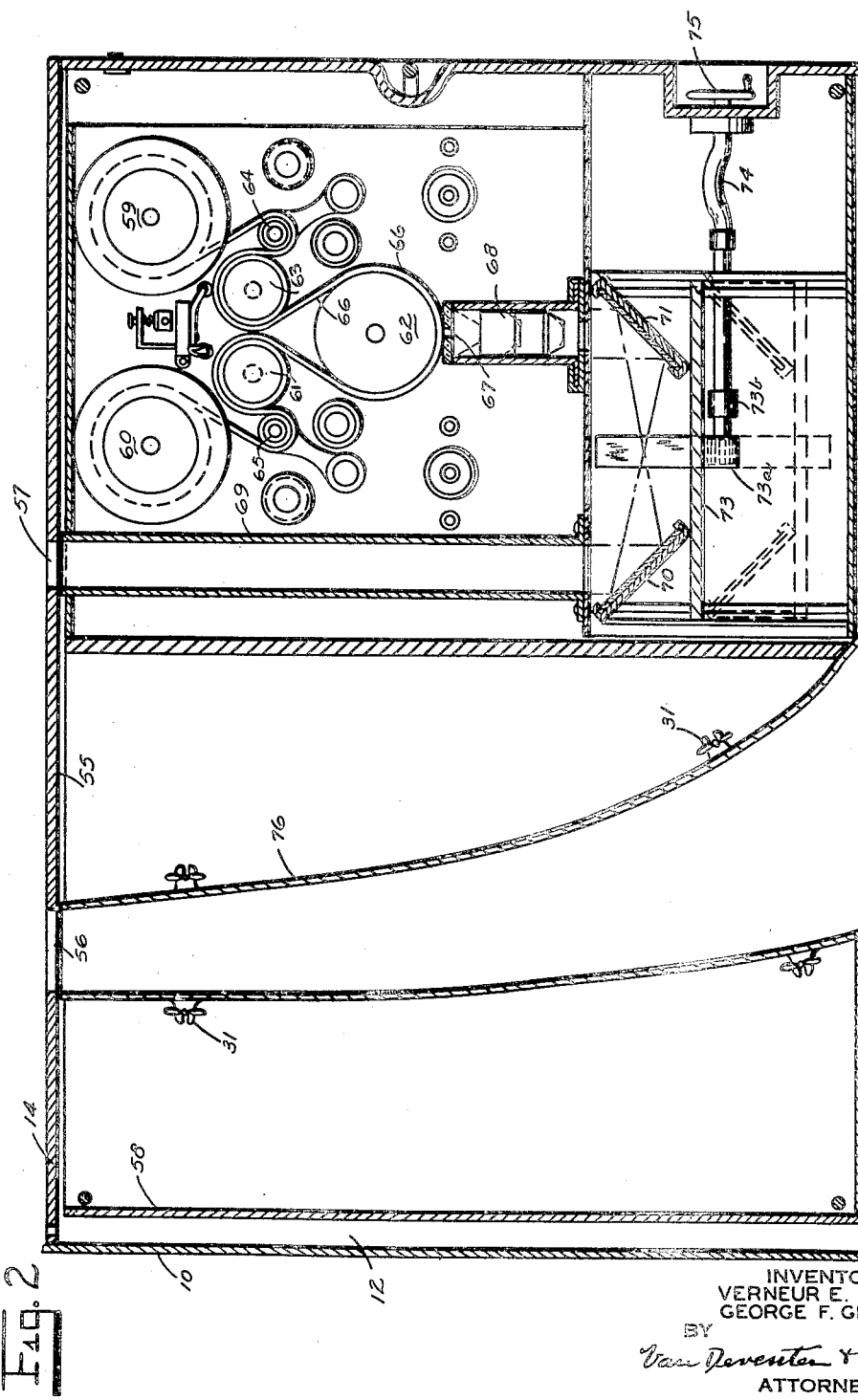

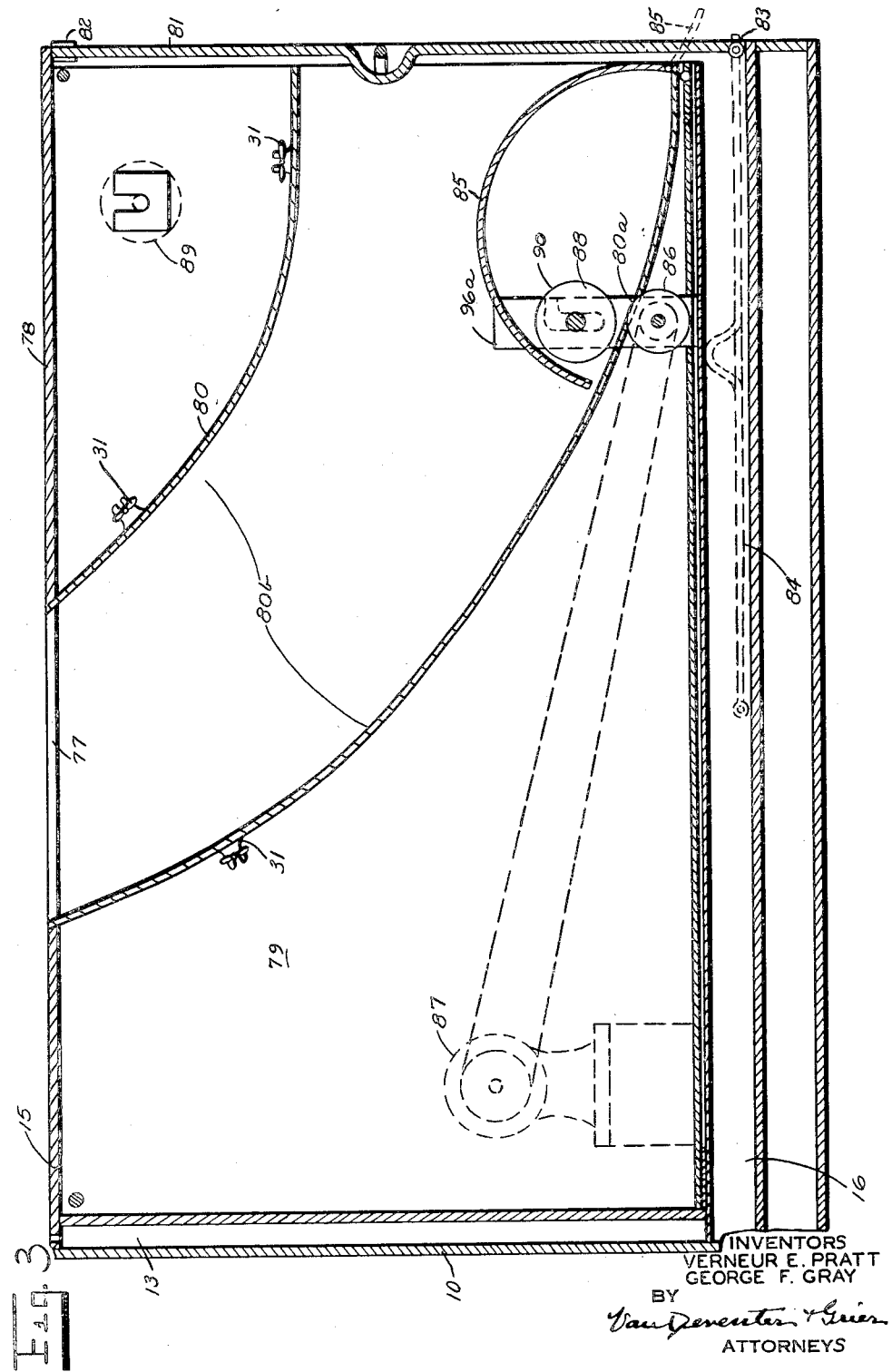

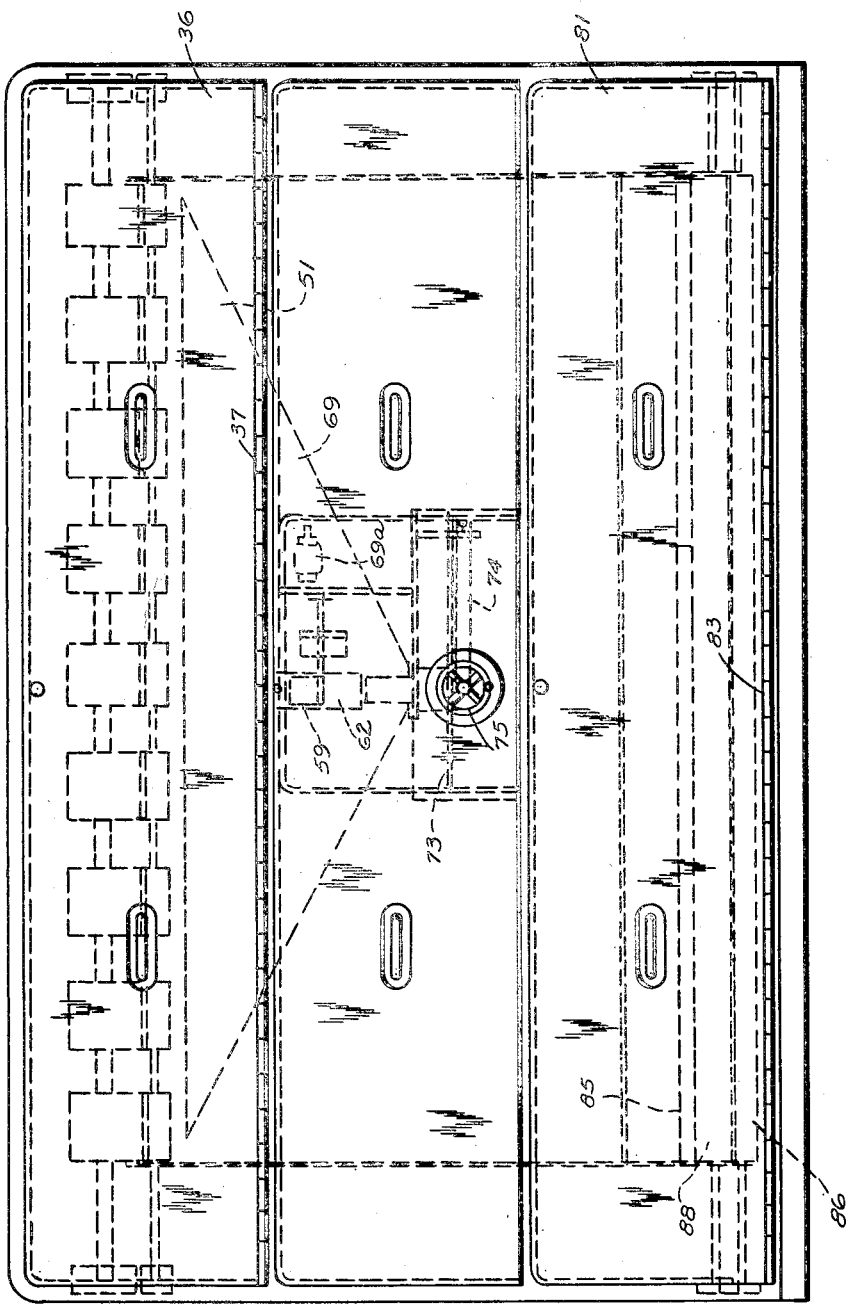

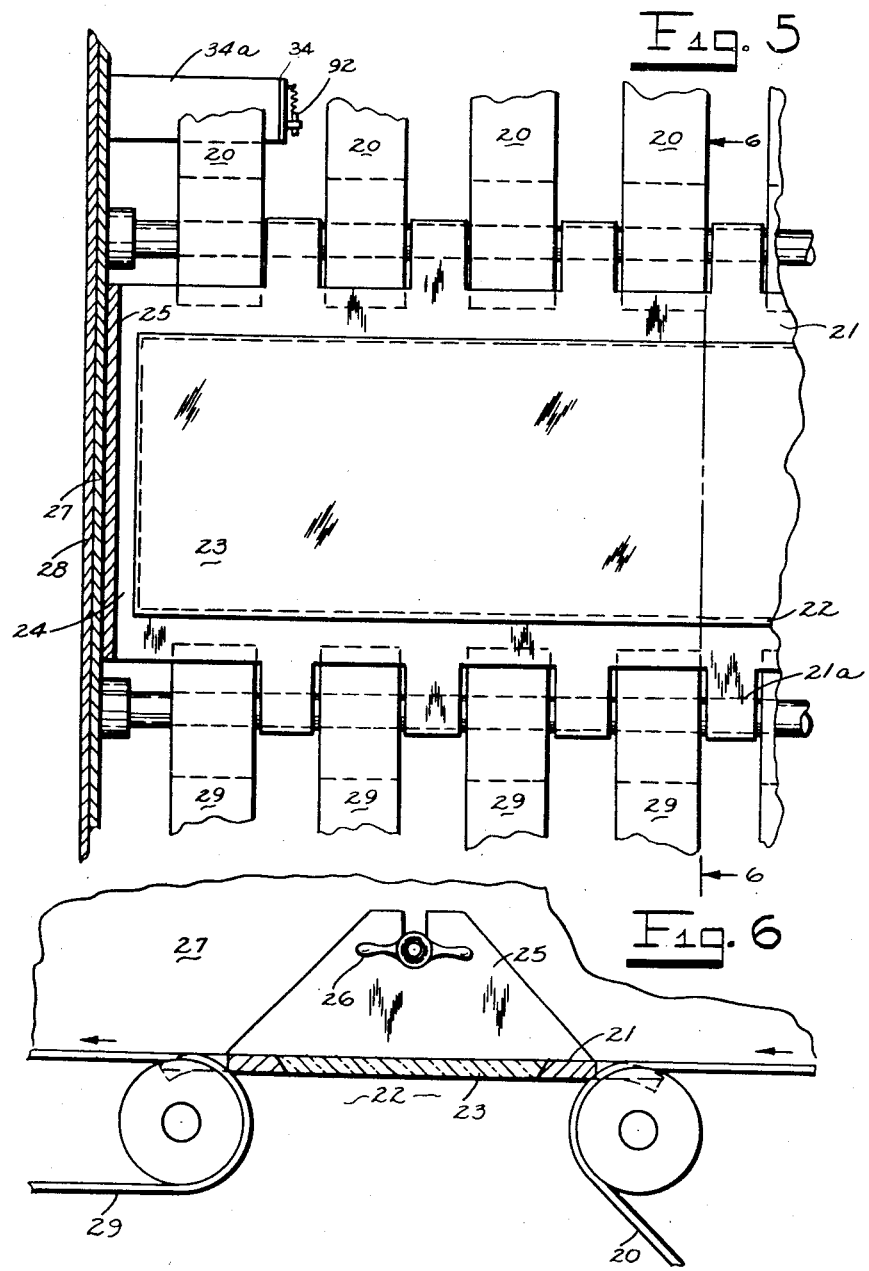

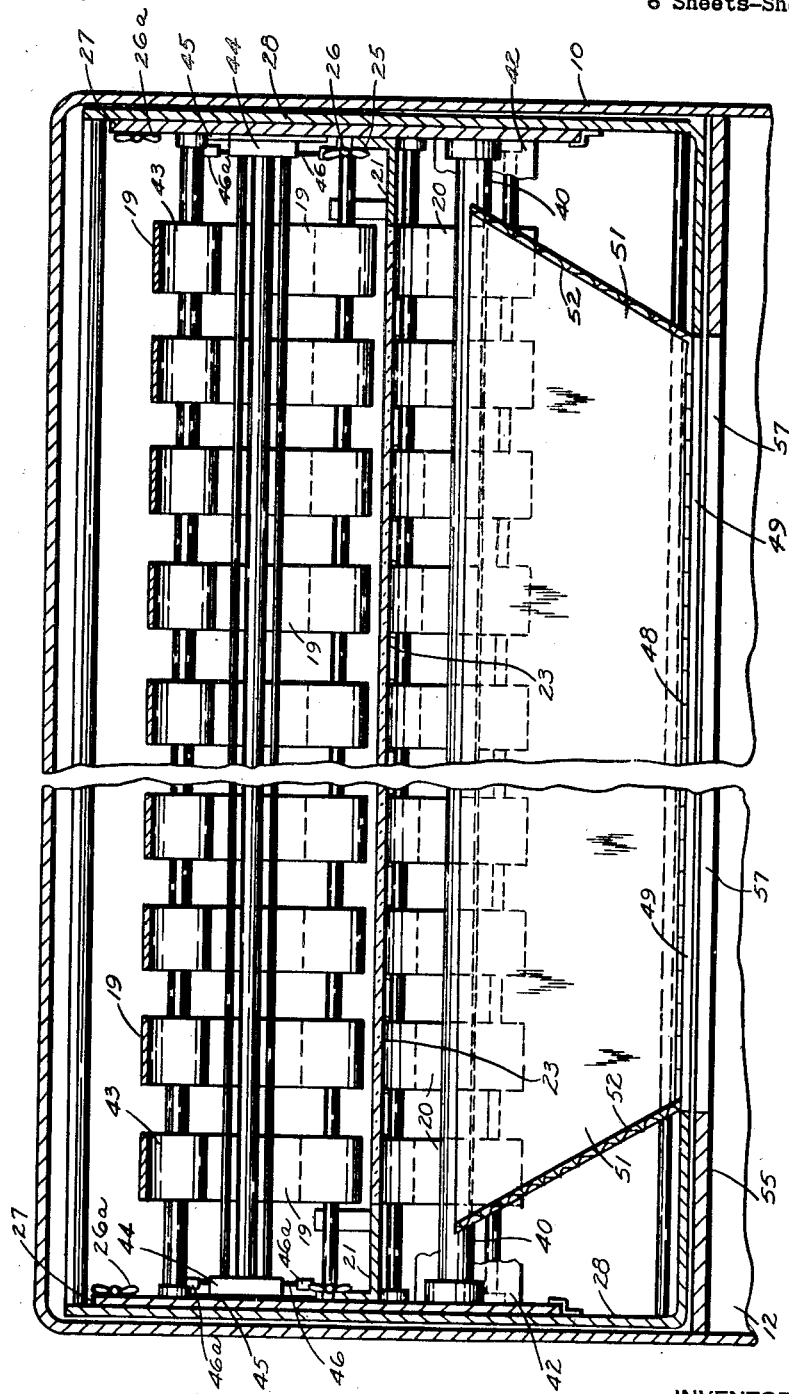

2,509,072

UNITED STATES PATENT OFFICE 2,509,072

FLOW CAMERA DOCUMENT COPYING MACHINE

Verneur E. Pratt and George F. Gray, Norwalk, Conn.

Application October 13, 1945, Serial No. 622,198

13 Claims. (Cl. 88—24)

This invention relates to improvements in flow cameras in which a feeder mechanism conveys the copy to be photographed past a slit, and the flowing slit image is impressed, via the lens of the camera, upon a moving sensitized film therein to produce a reduced image of said copy. Such small photographic images are commonly referred to as microfilms.

Flow cameras, of the prior art, have been used successfully when the documents to be filmed were of ordinary size, and flat, such as checks, letters, small drawings or the like. But when the individual sheets are relatively long and wide, for example, drawings 48 inches wide and 30 feet long, many difficulties are encountered, due to the fact that large drawings and the like are usually rolled up with the subject matter surface to the inside of the roll.

Heretofore, no flow camera capable of recording on sensitive film a true flow image of a large and long rolled map or drawing, has been devised. Instead such drawings are usually unrolled, weighted down, for example, with a sheet of glass, and photographed with a still camera. Usually overlapping sections are photographed, each section being not over 24" wide x 36" long. This means, with a drawing 48 inches wide x 36 feet long, it is necessary to make 12 to 16 overlapping exposures, with the resulting difficulty of matching accurately the overlapping pictures.

The reason for the use of a still camera in microfilming large drawings is that to obtain the necessary reduction, the area of the copy covered by one exposure is definitely limited. Large drawings photographed with a still camera are, of necessity, laid flat with the camera mounted above the drawing with the axis of the lens vertical. Even with a short focus lens this means the use of a camera of considerable height and with resultant tendencies toward vibration difference between the camera head and the copy itself.

Most wide and long drawings are stored in tight rolls in cardboard tubes, usually with the side containing the subject matter toward the inside of the roll. When such maps or drawings are microfilmed with a still camera, they must be laid flat with the drawing side up on a table. The drawings have a constant tendency to re-curl and this is usually nullified by placing the drawings under a flat piece of plate glass. The use of such a glass pressure plate invites fingerprints and reflections from extraneous lights in the room in which the camera is located.

Where known flow cameras have been employed to microfilm or copy wide and long maps or drawings, the camera head containing the lens is usually positioned above the copy and accordingly, to obtain the necessary reduction with wide copy, these cameras must be of such dimensions that they become not only unwieldy and subject to vibration, but are very difficult to load with film—such re-loading usually requiring the use of a step-ladder. To properly feed wide copy into a flow camera, the platen or feed shelf should be at the customary working height of a blueprint machine, say 44" above the floor. If this is done with an ordinary flow camera where the requirements for distance between the copy and lens is, say 50", then, allowing 24" above the lens for the film housing, supports, etc., the total height of the resulting device becomes 118" or nearly 10 feet, too tall for commercial use in the ordinary office with 8- or 9-foot ceilings, and much too difficult to re-load with film.

It is, therefore, a main object of the present invention to provide a flow camera, particularly adapted for large copy such as the wide and long drawings used in the aircraft, shipbuilding and automotive industries, and for wide maps used by the Government, oil surveyors and other large copy. While the present device is particularly suited for such wide and long copy, it of course can be used for copy of any smaller size.

Another object is to provide a flow camera that will take wide copy at a high reduction ratio, physical form being no higher than a four-drawer filing cabinet, usually 52" tall, and which will make a neat appearance when used in an office alongside such filing cabinets.

The improved flow camera herein described may be the same height as the camera disclosed in the co-pending application Serial Number 507,939, filed October 28, 1943, entitled "Photographic devices and method of operating same," now Patent No. 2,435,099 of January 27, 1948, and the processor for film shown in the co-pending application, Serial Number 507,938, filed October 28, 1943, entitled "Method and apparatus for automatically processing film," now Patent No. 2,428,681 of October 7, 1947, so that these three devices can be used alongside each other and present a compact, uniform and pleasing appearance.

A further object of our present invention is to provide a flow camera which will accept curled drawings which have been stored in tight rolls with the subject matter side downward so that the drawing does not resist, by its natural curl, smooth feeding through the conveyor.

Other objects and advantages of the invention will appear from a study of the following specification and the accompanying drawings, wherein by way of illustration one embodiment of the invention is disclosed.

In the accompanying drawings:

Figures 1, 2, and 3 are, respectively, side views partly in section of the top, middle, and bottom compartments of a camera embodying the invention, and when placed one above the other, form a complete side view of the device;

Figure 4 is a front view of the camera shown in the preceding figures;

Figure 5 is a view partly in section, on the line 5—5 of Figure 1;

Figure 6 is a view on the line 6—6 of Figure 5; and

Figure 7 is a view on the line 7—7 of Figure 1.

Referring to Figure 1, the numeral 10 denotes a supporting framework constructed in any suitable manner, preferably in the manner commonly employed in the fabrication of steel filing cabinets. This framework forms the outer casing of the device and is not described in detail, as the construction of same forms no part of the present invention.

By placing Figures 2 and 3 in order below Figure 1, it will be seen that the cabinet 10 has three horizontal compartments 11, 12 and 13 therein separated by the spacers 14, 15, and further defined if necessary by the horizontal transverse partitions 55, 58, and the lower partition similar to 58 upon which the bottom drawer 17 is slidably supported. It will be understood that all of the drawers 17, 58 and 59 slide in and out of the compartments 11, 12 and 13 in the cabinet 10, being slidably supported therein in any suitable manner, such as that shown and described.

Located in the upper compartment is a drawer 17 of any suitable construction, sliding in and out of the cabinet on the usual rails above the division space 14. This drawer forms a supporting framework for a sub-frame which contains a suitable feeder mechanism for feeding copy, a light source, and the upper ends of a light tunnel and delivery chute.

The feeder mechanism may be of any suitable construction, and may comprise a delivery table or slide 18 upon which the forward end of the copy is placed. This slide is the full width of the drawer 17, and the forward edge of same is positioned so that copy pushed forward thereon will be fed between the upper and lower series of belts 19, 20, which move the copy forward and on to the platen which may consist of the metal frame 21 having an opening 22 therein in which is inserted a piece of transparent material 23 such as glass, transparent plastic, or the like. However, it will be understood that the word "platen" is used in this specification to describe a member defining an area in the focal plane of the camera lens across which copy is moved. Obviously, such an area is defined by the opening 22 in the frame 21.

The leading edge of the copy will flow across the opening 22 as the copy is supported on its longitudinal edges by the horizontal flanges 24 of the frame 21, which is made removable from the drawer to permit cleaning by mounting frame 21 on end brackets 25, which in turn are secured by any suitable means, such as the thumb screws 26 to the end plates of a sub-frame 27 carrying all of the feeder parts, said sub-frame being secured to the sides 28 of drawer 17 in any suitable manner such as by thumb screws like 26a and clips 26b into which the lower edge of the side members of frame 27 rest.

Copy, having passed the opening 22, continues to feed across the platen on the left of 22 and marked 21a in Figure 1, and will be grasped by belts 19, 29, which deliver it to the upper end 95 of the upper section 30 of the delivery chute. The section 30 of the delivery chute may be removably secured to the sides 28 of drawer 17 by ears and thumb screws 31 supported on rods 31a extending outwardly from the sides 27 of the drawer. The belts 19, 20, 29 being in contact are all driven from the shaft 32 driven by synchronous motor 33 mounted on the sub-frame and removable from the drawer therewith.

A control mechanism, to be presently described and generally indicated by the numeral 34, is also mounted on the sub-frame 27 on bracket 34a so as to be removable from drawer 17 therewith.

Hingedly secured to delivery plate 18 is an extension thereof forming a roll holder 35 having bolts 35a at each side, which bolts may be extended to support the holder when same is outside the front of the cabinet as shown in dotted lines.

The drawer 17 has a front 36 hingedly secured at 37a to the bottom 37 of the drawer, and provided with a catch 38 which when released permits the front to be dropped down leaving the whole front of the upper compartment 11 open, so that an operator at the front of the camera can easily feed copy thereto.

When not in use, the roll holder 35 is folded into the drawer 17 and the front 36 is closed.

Mounted between the end plates of sub-frame 27 are the tubular electric lamps 39, 40 provided with suitable reflectors 41, 42 to reflect light to the platen opening 22 from below.

Mounted above the platen opening 22 is a tubular electric lamp 43. The terminal blocks for this lamp may form a lamp frame having end brackets 44. These ends run in guides 45 secured to the end plates of the sub-frame 27.

Any suitable means such as a cable 46 passing over rollers 46a is connected to the lamp frame and to a crank 47 on each side plate 47. By moving the cranks, lamp 43 can be moved toward and away from the back of the copy passing over opening 22 in the platen.

The upper section 48 of a light tunnel is supported on the bottom 37 of drawer 17 above the aperture 49 therein. This section has rigid sides 50, 51 and flexible bellows ends of fabric or the like shown at 52, and each side of the tunnel is hinged at 48a. By any suitable means, such as the Bowden wires 53, 54, the sides can be brought together to regulate the amount of light passing through the light tunnel.

The lamps 39 and 40, being ordinary commercial lamps, are designed for operation at some standard voltage—usually 110 volts. In different locations the voltage may be above or below the standard, and any variation in voltage will cause a variation in the intensity of illumination produced by the lamps and the K° (Kelvin) temperature. It is, therefore, desirable, in order to expose the film to a given density, to regulate the amount of light passing to the camera to compensate for the over or under brilliance of the lamps. This may be accomplished by varying the width of the light tunnel, and this variation can be brought about at any point between the copy and the lens, and preferably at the top of the light tunnel in the embodiment herein shown and described. This setting of the light tunnel is accomplished by moving the side 50 by operating the wire 53. This setting may remain fixed as long as the voltage supplied to the lamps remains fixed. This setting is usually set but once for any given location of the device, and may be termed the "initial setting," of the light source and is determined by using white copy in the platen, from which copy the light is reflected into the light tunnel.

Now, when copy of different colors is fed through the apparatus, the light reflected from such copy is different from that reflected from white copy, and a further regulation of the light is desirable. An example of colored copy is: red, blue, green and yellow record cards, invoices, order forms, and the like. To accomplish this further regulation, the side 51 of the light tunnel may be adjusted to further vary the quantity of light passing through the tunnel by operating wire 54. This second adjustment is accomplished without disturbing the "initial setting" above referred to and without varying the K° degree temperature of the lamps.

From the foregoing it will be observed that there is provided means for varying the density of the image impressed on the film without changing the speed of the copy or film, or the ratio of said speeds to each other, or the K° temperature of the lamps. It will be understood that the slit 67 is wide enough to take the maximum width of the light beam defined by the light tunnel, and consequently the manipulation of the sides 50, 51 of the light tunnel merely varies the intensity of the light beam within the slit.

It will be observed that the effect produced by the above adjustment of the intensity of the reflective beam from the copy is superior to all methods of the prior art. In accordance with the invention, we can operate the lamps in a flow camera at their rated K° value, and yet photograph images with substantially the same density from documents having various powers of reflectivity by varying the light tunnel in accordance with the individual reflectivities of the documents. The adjustable portion of the light tunnel may approximate in effect a slit the width of which is mechanically variable, which is positioned between the copy and the lens, and the slit between the lens and the film might be termed a prime slit within the limits of which all variations of the slit image from the variable slit may fall.

The old and well-known expedient of changing the current delivered to the lamps by inserting variable rheostats in the lamp circuit will not produce this effect, because any variation in the voltage or current not only causes a change in the intensity of the light, but also alters its K° value. As the emissivity of the light from colored copy is different, depending on the color, it would be necessary to vary the copy and film speeds to compensate for this difference, unless the light is controlled in accordance with our invention herein disclosed.

If a partition 55, Fig. 2 is used between the upper compartment 11 and the middle compartment 12, it is apertured as shown at 56 for the delivery chute and at 57 for the light tunnel, and the chute 30 and tunnel 48 are so placed on the bottom 37 of the drawer that when same is in place in the cabinet, the chute and tunnel openings in the bottom of the drawer register with the openings 56 and 57 in the partition 55.

The supporting structure forming the middle drawer 58 contains a flow camera of the type disclosed in the co-pending application Serial Number 507,939, filed October 28, 1943, entitled "Photographic devices and method of operating same," and apparatus for varying the length of the light path between the platen opening 22 and the lens of the camera, as more fully described in the co-pending application Serial Number 593,891, filed May 15, 1945, entitled "Optical system for micro film apparatus," now Patent No. 2,439,055 of April 6, 1948, together with sections of the delivery duct and the light tunnel. This drawer fits in middle compartment 12 of the casing.

The camera may be of any suitable construction, and a suitable type is described in the first co-pending application before mentioned. For the purpose of illustration herein, the camera has the usual delivery and take-up reels 59, 60, a feed roller 61, scanning drum 62, and guide rollers 63, 64, 65. The feed roller 61 is driven by a synchronous motor 69a, shown in dotted lines in Figure 4, to translate film from reel 59 to reel 60. The drum 62 supports a film 66 opposite a slit 67. The film is moved linearly at a speed proportional to the speed of the copy passing over the platen opening 22, and synchronized therewith. A lens 68 is positioned in front of the slit 67, its optical axis being perpendicular to the surface of the platen and displaced to one side of a vertical median line passing therethrough.

The middle section 69 of the light tunnel extends from immediately below the aperture 57 and forms an extension of the upper section 48 thereof. At the lower end of 69 a mirror 70 is placed to reflect light to a second mirror 71 which reflects the light beam through opening 72 and into lens 68.

The mirrors 70, 71, are mounted in a vertically adjustable frame 73 which by any suitable means, such as the rack 37a and pinion 73b, is moved by rotating flexible shaft 74 by knob 75. This arrangement for varying the length of the optical path between the flowing copy and the stationary lens is described in detail in the co-pending application Serial Number 593,891 aforementioned.

The mid-section 76 of the delivery chute is located in the drawer 58 and secured therein, same as described in connection with the upper section tunnel 30. It lines up with the opening 56 in the partition 55 and terminates aligned with the opening 77 in partition 78, if one is used.

The supporting structure forming bottom drawer 79 is placed in the lower compartment 13 of the casing and contains the discharge section 80 of the delivery duct, whereby copy is delivered to a point below the camera and at the front of the cabinet.

This compartment 13 has a front 81 forming a door provided with a catch 82 and hinged at 83 to the cabinet. This front can be opened, the drawer 79 removed and the front folded within the compartment 16, as shown at 84, Figure 3, and the drawer then replaced. The lower end of duct 80 has a roll holder 85 pivoted to lie within the duct when not in use and withdrawn as shown in dotted lines when needed.

A delivery feed roller 86 may extend into the duct 80 as shown at 80a, and may be driven by the synchronous motor 87. Both roller and motor are mounted in drawer 79 and are removable from the cabinet therewith.

A roller 88 is stored on brackets in the drawer 79 as shown in dotted lines at 89. When desired this roller can be lifted out of its storage position and placed in the brackets 90a on the side walls of the chute so as to be across same as shown at 90, copy being grasped between rollers 86 and 88, and fed outwardly thereby.

Assuming the copy to be microfilmed comprises a drawing 42 inches wide, and 20 feet long, and that it is delivered to the camera rolled up. The operator places the roll of copy in the roller holder 35 so the copy can be fed over the delivery table 18 face down. When in this position, the leading edge of the copy (if it has been rolled free inwardly, as is usually the case) tends to curl downwardly, but due to the fact that it is engaged by the feeder, it is held straight, at least within the area being scanned by the reaction against the surface of the delivery table.

The switch 91 for controlling the feeder motor 33 is closed and the feeder belts operate to grasp the copy and move it forward. The advancing edge of the copy encounters the upstanding arm 92 of the control mechanism 34, thus closing the contacts 93 of said mechanism which close the circuits through the lamps 39 and 40 (and the lamp 43 if used), and also starts or connects the camera motor 69a to the camera mechanism to move film 66 therein, as more fully described in the first co-pending application heretofore mentioned. The switch for the control circuit may be at 94.

As the copy passes across the opening 22 of the platen it will be illuminated by the light from the lamps, and the light reflected from the copy passes downwardly in the light tunnel formed by 48 and 69 impinges upon mirror 70, is reflected to mirror 71, and thence to lens 68 and via slit 67 to film 66. As the film 66 is moving past the lens at the proper speed relative to the speed of the copy, a continuous image of the copy as it passes the opening 22 in the platen is recorded on the film.

The forward edge of the copy encounters the upstanding edge 95 of the upper section 30 of the delivery chute and is deflected downwardly thereby and is fed into the chute by the action of the feeder. That portion of the copy in the chute and free from the restraint of the feeder belts (as it has been rolled) tends to reroll itself and starts immediately to do so as it moves down the chute. As the copy moves downwardly it may roll up several turns on itself, and to prevent this roll from wedging in the chute, the latter is made progressively wider as in the dimension 80b as it approaches the delivery or discharge end at the bottom of the cabinet.

As soon as the copy begins to come out of the lower end of the chute it can be further rolled up and placed in the lower roll holder 85.

Usually the rollers 86, 88 are not used, but if it is desired to gently pull the copy downward through the chute, these may be employed. As soon as the leading edge of the copy appears at roller 86, the weighted roller 88 is placed on top of the copy and the motor 87 started by closing switch 96. The rollers will now feed the copy outwardly at the bottom of the chute and it can, therefore, be rolled and placed in holder 85. When the end of the copy is reached, arm 92 of the control mechanism 34 is released to open contacts 93 and the circuits to the lamps and the camera control are opened. The film 66 therefore stops moving.

It will be clear from the foregoing description that the drawers 17, 58, 79 are each separately removable from the casing. Any electrical circuits to the equipment in the drawers may be provided with quick detachable connectors or plug-and-socket connectors that are automatically made and broken as each drawer is put into or removed from the casing, as described in the first co-pending application previously mentioned.

The camera is loaded and unloaded by withdrawing drawer 58 containing same and proceeding as described in said first co-pending application.

The construction herein described enables a flow camera to be constructed for wide copy that is but slightly higher than the natural working height of the platen to the floor, viz., 44 inches, and having a total height of not over 52 inches, that of a standard four-drawer file cabinet. This advantage is attained largely by inverting the camera and putting it below the platen instead of above same which has been the practice heretofore. At the same time the necessary focal length of the lens and platen-to-lens distance has been preserved by reason of the embodiment of the adjustable means for varying the platen-to-lens distance, as briefly described herein, and as more fully described in a third co-pending application Serial Number 547,002, filed July 28, 1944, and entitled "Optical system for cameras or projectors," now abandoned.

With some copy, especially tracings, the upper lamp 43 is advantageous, as it will project light through the copy and give greater contrast between the lines on the copy and the background. When this light is used, it may be adjusted as previously described until the desired results are attained. In some cases it is desirable to use the upper lamp 43 alone, making the photograph entirely by light passing through the copy. In other cases, lights on both sides or on the face only of the copy can be used to give best results.

What is claimed is:

1. A device of the character described comprising a casing having three sections therein arranged one above the other, a feeder mechanism positioned in the upper section and accessible from the front of the device, a camera positioned in the middle section, means defining a light tunnel in said first and second sections whereby an optical path is defined between said feeder mechanism and said camera, said path crossing the division space between said first and second sections, and a delivery duct having a portion passing through said second section and having its upper end terminating in said first section and its discharge end in said third section whereby copy may be delivered to the front of the device.

2. The device as claimed in claim 1 wherein each of the said sections contains a removable drawer, the upper drawer containing said feeder mechanism, the middle drawer said camera, and the lower drawer the discharge end of said delivery duct, and cooperating means on said framework and drawers whereby, when said drawers are in place in said cabinet, the continuity of the optical path between said feeder and said camera, and the continuity of said delivery duct between said feeder and the discharge end of said duct is maintained.

3. A device of the class described comprising a cabinet, a feeding unit in said cabinet and having a horizontal platen defining an area on the underside of said platen to be photographed across which copy may be advanced over said platen by the operation of said unit, lighting means in said cabinet adjacent said platen for illuminating copy in said area, a camera in said cabinet below said platen having a lens, means forming a slit in the light path below said platen between said area and said lens including a light tunnel having adjustable walls whereby the distance therebetween can be varied for regulating the amount of light entering said lens.

4. In a device of the character described, a supporting structure, a drawer therein, a feeding mechanism in said drawer including a sub-frame removably supported therein, a platen removably supported on said sub-frame and removable from said structure therewith, and a flow camera mounted in said supporting structure and adapted to photograph copy moved over said platen by said feeding mechanism.

5. The combination as claimed in claim 4 wherein said sub-frame carries a light source for illuminating copy on said platen.

6. The combination as claimed in claim 4 wherein a motor for driving said feeding mechanism is mounted on said sub-frame.

7. The combination as claimed in claim 4 wherein a control device for starting and stopping said camera is mounted on said sub-frame.

8. The combination as claimed in claim 4 wherein a delivery chute is mounted in said structure adjacent said feeding mechanism to receive copy fed therethrough, and a light tunnel is mounted adjacent said platen to partly define a light path from said platen to said camera.

9. In a device of the character described, in combination with a flow camera, a supporting structure having side walls and a hinged front, a feeding mechanism for the camera within said structure, a delivery table for said mechanism, and an extension for said delivery table secured adjacent thereto and movable when said front is opened from a position entirely within said structure to a position outside the side walls thereof.

10. In a device of the character described, a cabinet, a supporting structure removably positioned in said cabinet, said cabinet having a compartment with a door opening, said compartment adapted to receive said structure, a door for said compartment, a second compartment in said cabinet below said structure into which said door may be folded when said supporting structure is removed from the cabinet, a feeding mechanism in said cabinet, and a duct in said structure adapted to guide copy discharged from said mechanism and conduct same to the door opening in said cabinet.

11. The combination as claimed in claim 10 wherein delivery feed mechanism is mounted in said structure and is adapted to assist copy through said chute and out the door opening of the cabinet.

12. A device for photographing matter contained on rolled webs with the subject matter facing inwardly, comprising a feed table having a horizontal platen therein, a feeding unit including web advancing means partially above and partially below said platen and adapted to engage and advance a web across said platen when the leading end of said rolled web is placed in engagement therewith, means to illuminate an area defined by the underside of said platen, a lens and film moving means associated therewith and mounted below said feed table and having said platen in the field of view of said lens, a film moved by said means in definite timed linear relation to the linear movement of the web over said platen, the spaced relation between said platen and said feeding unit serving to maintain flat the portion of said web actually being photographed during the entire time said web is being advanced over said platen to be photographed from the underside thereof, means at the outer edge of said feed table to support a rolled web, said table having an aperture therein, a guide chute communicating with said aperture adapted to guide said web downwardly to a position below said camera, and an arcuate roll holder at the bottom of said chute in which said web may re-roll after the subject matter thereon has been photographed.

13. A flow camera including a lens, a feed table for conveying documents across the field of said lens, means for moving film in said camera in definite timed relation to the movements of the documents by said feed table, illumination with a constant K° value impinging on the documents as they are moved by said feed table, a supporting framework for said camera, a light tunnel on said framework between said feed table and said lens, said light tunnel including at least one portion which is pivotally secured to said framework and movable with respect to other portions of said tunnel and manually operable means connected to said movable portion of said tunnel for varying the quantity of light passing therethrough to said lens and consequently to said film in accordance with the reflectivity of said documents, said last means being operable while said camera and feed table are in operation.

VERNEUR E. PRATT.
GEORGE F. GRAY.

REFERENCES CITED

The following references are of record in the file of this patent:

UNITED STATES PATENTS

| Number | Name | Date |
|---|---|---|
| 711,891 | Butter | Oct. 21, 1902 |
| 771,607 | Burns | Oct. 4, 1904 |
| 867,396 | Muller | Oct. 1, 1907 |
| 976,208 | Perring | Nov. 22, 1910 |
| 1,391,807 | Swalm et al. | Sept. 27, 1921 |
| 1,802,977 | Langsner | Apr. 28, 1931 |
| 1,806,763 | McCarthy | May 26, 1931 |
| 1,808,118 | Peterson | June 2, 1931 |
| 1,919,957 | Lyman et al. | July 25, 1933 |
| 1,993,178 | Mitchell et al. | Mar. 5, 1935 |
| 2,115,563 | Tauschek | Apr. 26, 1938 |
| 2,121,061 | Townsend | June 21, 1938 |
| 2,177,135 | Fassel | Oct. 24, 1939 |
| 2,186,986 | Nelson | Jan. 16, 1940 |
| 2,251,570 | Hessert | Aug. 5, 1941 |
| 2,292,825 | Dilks, Jr. | Aug. 11, 1942 |
| 2,335,956 | Oiler | Dec. 7, 1943 |
| 2,411,694 | Place | Nov. 26, 1946 |